United States Patent
Tan et al.

(10) Patent No.: US 11,187,844 B2
(45) Date of Patent: Nov. 30, 2021

(54) DISPLAY DEVICE AND CONTROL METHOD THEREOF

(71) Applicant: BOE TECHNOLOGY GROUP CO., LTD., Beijing (CN)

(72) Inventors: Jifeng Tan, Beijing (CN); Wei Wang, Beijing (CN); Xiandong Meng, Beijing (CN); Xianqin Meng, Beijing (CN); Jian Gao, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/644,708

(22) PCT Filed: Sep. 16, 2019

(86) PCT No.: PCT/CN2019/105891
§ 371 (c)(1),
(2) Date: Mar. 5, 2020

(87) PCT Pub. No.: WO2020/063376
PCT Pub. Date: Apr. 2, 2020

(65) Prior Publication Data
US 2021/0018674 A1    Jan. 21, 2021

(30) Foreign Application Priority Data
Sep. 30, 2018 (CN) .......................... 201811161266.9

(51) Int. Cl.
*G02F 1/13357*       (2006.01)
*F21V 8/00*          (2006.01)
(Continued)

(52) U.S. Cl.
CPC ......... *G02B 6/0055* (2013.01); *G02B 6/0031* (2013.01); *G02B 6/0068* (2013.01);
(Continued)

(58) Field of Classification Search
CPC ... G02F 1/133615; G02F 2001/134345; G02F 1/1337; G02F 2001/133622;
(Continued)

(56) References Cited

U.S. PATENT DOCUMENTS

2004/0135942 A1* 7/2004 Lee .................. G02F 1/133615
                                                       349/113
2004/0240232 A1* 12/2004 Choi .................... G02B 6/0026
                                                       362/583
(Continued)

FOREIGN PATENT DOCUMENTS

CN    1573462 A    2/2005
CN    1598661 A    3/2005
(Continued)

OTHER PUBLICATIONS

Fourth Office Action (with English translation) issued in corresponding CN application No. 2018111612669 dated Mar. 29, 2021 (10 pages).

*Primary Examiner* — Mariam Qureshi
(74) *Attorney, Agent, or Firm* — Muncy, Geissler, Olds & Lowe, P.C.

(57) ABSTRACT

Display device, control method are provided, which includes: light guide plate including light incident side, bottom surface, opposite light exiting surface; light extracting structure, on light exiting or bottom surface, configured to make light propagated in total reflection in light guide plate exit from light exiting surface at predetermined angle; first low refractive index layer, covering light exiting surface, refractive index of which being smaller than that of light guide plate; liquid crystal light adjusting layer, including liquid crystal layer and driving electrodes for driving liquid crystal molecules, on side of first low refractive index layer away from light exiting surface; second low refractive index layer, on side of liquid crystal light adjusting layer (Continued)

away from first low refractive index layer, refractive index of which and refractive index of first low refractive index layer being smaller than initial refractive index of liquid crystal light adjusting layer.

18 Claims, 8 Drawing Sheets

(51) Int. Cl.
  *G02F 1/1335* (2006.01)
  *G02F 1/1337* (2006.01)
  *G02F 1/1343* (2006.01)
(52) U.S. Cl.
  CPC ...... *G02F 1/1337* (2013.01); *G02F 1/133621* (2013.01); *G02F 1/134309* (2013.01); *G02F 1/133622* (2021.01); *G02F 1/134345* (2021.01)
(58) Field of Classification Search
  CPC ......... G02F 1/133621; G02F 1/133524; G02B 6/0031; G02B 6/0055; G02B 6/0068; F21V 17/00; F21V 2200/00; B29D 11/00663
  See application file for complete search history.

(56) References Cited

U.S. PATENT DOCUMENTS

| | | | |
|---|---|---|---|
| 2005/0253987 A1 | 11/2005 | Stephenson, III et al. | |
| 2012/0281273 A1* | 11/2012 | Shinkai | G02F 1/13476 359/315 |
| 2013/0070188 A1* | 3/2013 | Ishikawa | G02F 1/133512 349/110 |
| 2016/0091772 A1* | 3/2016 | Okamoto | G02B 27/017 345/7 |
| 2018/0031875 A1* | 2/2018 | Qin | G02F 1/133615 |
| 2018/0188440 A1* | 7/2018 | Fattal | G02B 1/12 |
| 2018/0284540 A1 | 10/2018 | Wang et al. | |
| 2019/0101681 A1 | 4/2019 | Meng et al. | |
| 2019/0324305 A1* | 10/2019 | Numata | G02F 1/133615 |
| 2020/0217996 A1* | 7/2020 | Fattal | G02B 5/18 |

FOREIGN PATENT DOCUMENTS

| | | |
|---|---|---|
| CN | 101852942 A | 10/2010 |
| CN | 105974672 A | 9/2016 |
| CN | 106908996 A | 6/2017 |
| CN | 108051936 A | 5/2018 |
| CN | 108333835 A | 7/2018 |
| CN | 109239965 A | 1/2019 |

\* cited by examiner

DISPLAY DEVICE AND CONTROL METHOD THEREOF

CROSS-REFERENCE TO RELATED APPLICATIONS

This application is the U.S. national phase of PCT Application No. PCT/CN2019/105891 filed on Sep. 16 2019, which claims a priority to Chinese Patent Application No. 201811161266.9 filed on Sep. 30, 2018, the disclosures of which are incorporated in their entirety by reference herein.

TECHNICAL FIELD

The present disclosure relates to the field of display technology, and in particular to a display device and a control method thereof.

BACKGROUND

In the related technologies, for a liquid crystal display device, upper and lower polarizers are respectively needed to be arranged on a liquid crystal display panel to realize display of gray levels. However, due to the existence of the polarizers, the problem of low light transmittance is caused, especially for a transparent display device, transparency and brightness of which are greatly affected.

SUMMARY

A display device is provided in embodiments of the present disclosure, including:

a light guide plate, where the light guide plate includes a light incident side, a bottom surface and a light exiting surface, and the bottom surface and the light exiting surface are opposite to each other;

a light extracting structure, arranged on a side of the light exiting surface or the bottom surface of the light guide plate and configured to enable light that is propagated in a totally reflected manner in the light guide plate to exit from the light exiting surface of the light guide plate at a predetermined angle;

a first low refractive index layer, covering the light exiting surface of the light guide plate, where a refractive index of the light guide plate is greater than a refractive index of the first low refractive index layer;

a liquid crystal light adjusting layer, including a liquid crystal layer and driving electrodes for driving liquid crystal molecules in the liquid crystal layer to be deflected, where the liquid crystal light adjusting layer is arranged on a side of the first low refractive index layer away from the light exiting surface; and a second low refractive index layer, arranged on a side of the liquid crystal light adjusting layer away from the first low refractive index layer, where each of the refractive index of the first low refractive index layer and a refractive index of the second low refractive index layer is smaller than an initial refractive index of the liquid crystal light adjusting layer.

Optionally, the initial refractive index of the liquid crystal light adjusting layer is a refractive index of the liquid crystal light adjusting layer when a reference voltage is applied to the driving electrode.

Optionally, the reference voltage is 0 volt.

Optionally, the display device includes multiple pixel regions in an array, and each of the multiple pixel regions includes multiple sub-pixel regions;

the driving electrodes comprises: a first electrode including multiple first sub-electrodes arranged in one-to-one correspondence with the sub-pixel regions, and a second electrode arranged opposite to the first electrode; and the second electrode is an entire block of electrode corresponding to the multiple the first sub-electrodes, or, the second electrode includes multiple second sub-electrodes each being arranged corresponding to at least one of the first sub-electrodes.

Optionally, the display device includes multiple pixel regions in an array, where each of the multiple pixel regions includes multiple sub-pixel regions, the light extracting structure includes multiple light extracting gratings in an array, and each of the multiple light extracting gratings is arranged corresponding to one sub-pixel region.

Optionally, the liquid crystal light adjusting layer further comprises:

a first alignment layer, arranged on a side of the liquid crystal layer close to the first low refractive index layer; and a second alignment layer, arranged on a side of the liquid crystal layer close to the second low refractive index layer.

Optionally, the display device includes a base substrate, arranged on a side of the liquid crystal layer away from the light guide plate, where the base substrate is made of a low refractive index material to form the second low refractive index layer;

or, the display device further includes a base substrate separately arranged on a side of the second low refractive index layer away from the liquid crystal light adjusting layer.

Optionally, the display device further comprises:

a light source, arranged on the light incident side of the light guide plate and configured to emit light into the light guide plate.

Optionally, the light source comprises:

a first light source component, arranged on a side of the light incident side of the light guide plate, where the first light source component includes multiple monochromatic light sources for emitting multiple monochromatic lights with different colors; and a first light adjusting component, arranged between the first light source component and the light incident side of the light guide plate;

among the multiple monochromatic light sources, the monochromatic light sources corresponding to the monochromatic lights with different colors are in different positions or have different light exiting angles, so that the monochromatic lights with different colors are incident into the light guide plate, via the first light adjusting component, at different preset angles to perform transmission in a totally reflected manner and are emitted from the light exiting surface of the light guide plate at a same exit angle by the light extracting structure.

Optionally, the first light adjusting component includes a first reflective surface, the first reflective surface includes a reflective plane and/or a reflective paraboloid, the first reflective surface is arranged facing a light exiting surface of the light source component, the first reflective surface has a first preset shape, and the first preset shape enables the monochromatic lights with different colors from light emitted by the first light source component to be incident into the light guide plate at the different preset angles to perform transmission in a totally reflected manner, and to be emitted from the light exiting surface of the light guide plate at the same exit angle by the light extracting structure.

Optionally, the display device further comprises:

a light source control unit, connected to the light source and configured to drive monochrome light sources corresponding to monochromatic lights with different colors in the light source in a time division manner, where driving voltages on the monochrome light sources corresponding to the monochromatic lights with different colors are the same, so that the monochromatic lights with the colors have a same brightness; and a liquid crystal light adjusting layer control unit, connected to the driving electrodes, and configured to drive the driving electrodes in a time division manner and control to apply different voltages in different time periods to the driving electrodes corresponding to the different sub-pixel regions in each pixel region.

Optionally, the display device further comprises:

a liquid crystal light adjusting layer control unit, connected to the driving electrodes and configured to drive the driving electrodes in a time division manner, where voltages applied to the driving electrodes corresponding to the sub-pixel regions in different time periods is the same; and a light source control unit, connected to the light source and configured to drive the monochrome light sources corresponding to the monochromatic lights with different colors in the light source in a time division manner, where driving voltages on the monochrome light sources corresponding to the monochromatic lights with different colors are different.

Optionally, the light source comprises:

a second light source component, arranged on a side of the light incident side of the light guide plate and configured to emit white light; and a second light adjusting component, arranged between the second light source component and the light incident side of the light guide plate, and configured to enable the white light emitted by the second light source component to be incident into the light guide plate so as to be propagated in a totally reflected manner, and to be emitted from the light exiting surface of the light guide plate at different angles by the light extracting structure so as to be split into multiple monochromatic lights with different colors;

the display device includes multiple pixel regions in an array, each of the multiple pixel regions includes multiple sub-pixel regions, the multiple monochromatic lights respectively enter the multiple sub-pixel regions in a one-to-one correspondence, the driving electrodes includes multiple first sub-electrodes which is arranged in a one-to-one correspondence with the sub-pixel regions, each of the multiple first sub-electrodes includes multiple grating-like electrodes, and in the same pixel region, the grating-like electrodes in the first sub-electrodes corresponding to different sub-pixel regions have different arrangement periods.

Optionally, the second light adjusting component includes a second reflective surface, the second reflective surface includes a reflective plane and/or a reflective paraboloid, the second reflective surface is arranged facing a light exiting surface of the second light source component, the second reflective surface has a second preset shape, and the second preset shape enables the white light emitted by the second light source component to enter the light guide plate so as to be propagated in a totally reflected manner.

Optionally, the display device further comprises:

a liquid crystal light adjusting layer control unit, connected to the driving electrodes and configured to control driving voltages on the driving electrodes corresponding to the different sub-pixel regions in each pixel region.

Optionally, the multiple monochromatic lights include red light, green light, and blue light, the multiple sub-pixel regions in each pixel region include a red light sub-pixel region corresponding to the red light, a green light sub-pixel region corresponding to the green light and a blue light sub-pixel region corresponding to the blue light, an arrangement period of the multiple grating-like electrodes in the red light sub-pixel region is greater than an arrangement period of the multiple grating-like electrodes in the green light sub-pixel region, and the arrangement period of the multiple grating-like electrodes in the green light sub-pixel region is greater than an arrangement period of the multiple grating-like electrodes in the blue light sub-pixel region.

Optionally, the display device is a transparent display device without a polarizer and a light shielding layer.

A method for controlling a display device, applied to the display device as described above, comprising:

applying a first voltage to the driving electrodes to control the liquid crystal light adjusting layer to have the initial refractive index, so that light emitted from the first low refractive index layer is propagated in a totally reflected manner in the liquid crystal light adjusting layer, where the first voltage is a reference voltage; and applying a second voltage to the driving electrodes to adjust a deflection direction of the liquid crystal molecules in the liquid crystal light adjusting layer, so that light emitted from the first low refractive index layer is deflected by the liquid crystal light adjusting layer and emitted from a surface of the second low refractive index layer away from the liquid crystal light adjusting layer.

Further, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

driving the monochromatic light sources corresponding to the monochromatic lights with different colors in the light source in a time division manner, where driving voltages on the monochromatic light sources corresponding to the monochromatic lights with different colors are the same, to enable the monochromatic lights with the colors to have a same brightness; and driving the driving electrodes in a time division manner, where different voltage are controlled to be applied to the driving electrodes corresponding to the different sub-pixel regions in each pixel region in different time periods, to adjust deflection directions of the liquid crystal molecules in the sub-pixel regions corresponding to the monochromatic lights with different colors.

Optionally, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

driving the driving electrodes in a time division manner, where voltage applied to the driving electrodes corresponding to the sub-pixel regions in different time periods are the same;

driving the monochromatic light sources corresponding to the monochromatic lights with different colors in the light source in a time division manner, where driving voltages on the monochromatic light sources corresponding to the monochromatic lights with different colors are different, to adjust deflection directions of the liquid crystal molecules of the sub-pixel regions corresponding to the lights with different colors.

Optionally, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

controlling driving voltages on the driving electrodes corresponding to the different sub-pixel regions in each pixel region, to adjust deflection directions of the liquid crystal molecules in the different sub-pixel regions in each pixel region.

DETAILED DESCRIPTION

Figure 1:
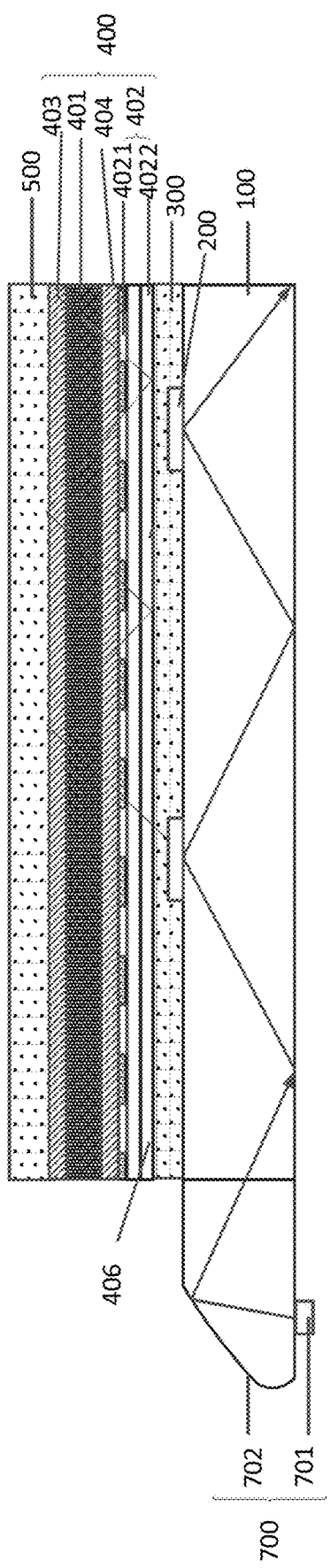
FIG. 1 is a schematic structural diagram of a display device provided in an exemplary embodiment of the present disclosure when the display device is in a dark state.

To make objectives, technical solutions, and advantages of embodiments of the present disclosure clearer, the technical solutions of the embodiments of the present disclosure will be clearly and completely described hereinafter with reference to the accompanying drawings of the embodiments of the present disclosure. Apparently, the described embodiments are a part rather than all of the embodiments of the present disclosure. Based on the described embodiments of the present disclosure, all other embodiments obtained by those skill in the art fall within the protection scope of the present disclosure.

To address the technical problem in the related technologies that the liquid crystal display device needs to be provided with a polarizer, which affects light transmittance of the display device, embodiments of the present disclosure provide a display device and a control method thereof, without the need of providing a polarizer, to improve the influence of the polarizer on the light transmittance of the display device in the related technologies.

As shown in FIGS. 1 to 3 and 10, a display device provided in embodiments of the present disclosure includes:

a light guide plate 100, including a light incident side, a bottom surface and a light exiting surface, where the bottom surface and the light exiting surface are arranged opposite to each other;

a light extracting structure 200, arranged on a side of the light exiting surface or the bottom surface of the light guide plate 100, and configured to enable light that is totally reflected in the light guide plate 100 to exit from the light exiting surface of the light guide plate at a predetermined angle (that is, be extracted from the light guide plate);

a first low refractive index layer 300, covering the light exiting surface of the light guide plate 100, where a refractive index of the light guide plate 100 is greater than a refractive index of the first low refractive index layer 300;

a liquid crystal light adjusting layer 400, including a liquid crystal layer 401 and driving electrodes 402 for driving liquid crystal molecules in the liquid crystal layer 401 to be deflected, where the liquid crystal light adjusting layer is arranged on a side of the first low refractive index layer 300 away from the light exiting surface; and a second low refractive index layer 500, arranged on a side of the liquid crystal light adjusting layer 400 away from the first low refractive index layer 300, where each of the refractive index of the first low refractive index layer 300 and a refractive index of the second low refractive index layer 500 is smaller than an initial refractive index of the liquid crystal light adjusting layer 400.

Figure 3:
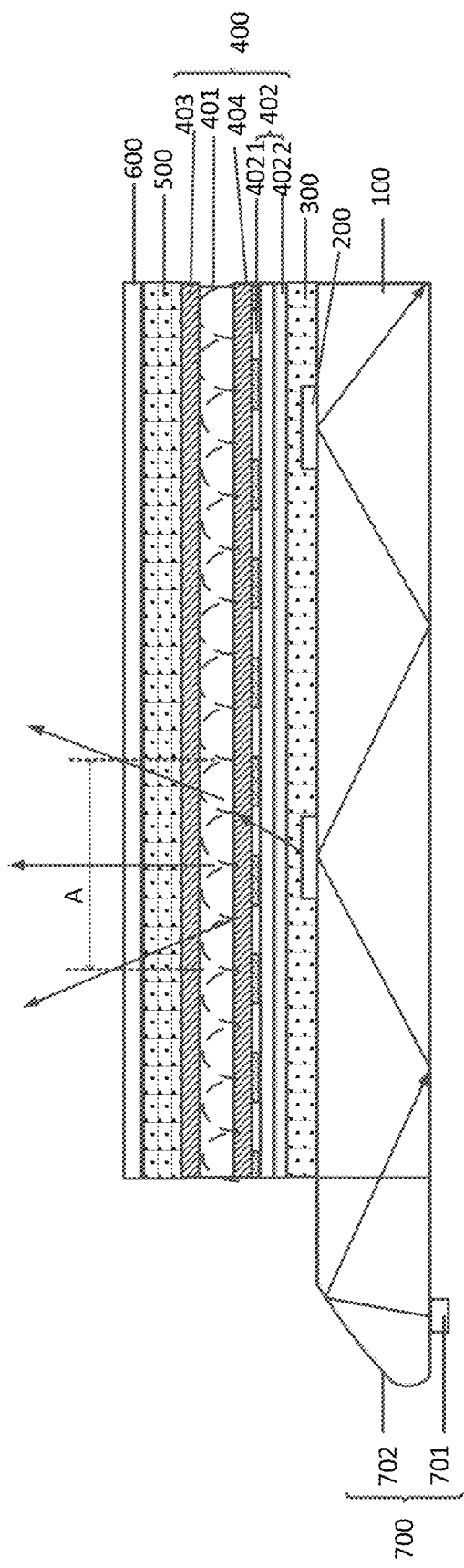
FIG. 3 is a schematic structural diagram of a display device provided in an exemplary embodiment of the present disclosure in a gray level state.

In the above solution, the first low refractive index layer 300 is provided on the side of the light exiting surface of the light guide plate 100, and the refractive index of the first low refractive index layer 300 is smaller than that of the light guide plate 100. In this way, the light guide plate 100 and the first low refractive index layer 300 form an optical waveguide, and light incident on the light guide plate 100 from the light source can be propagated in a totally reflected manner in the light guide plate 100; by providing the light extracting structure 200 on the side of the bottom surface or the light exiting surface of the light guide plate 100, the light that is propagated in the totally reflected manner in the light guide plate 100 is emitted from the light exiting surface of the light guide plate to the liquid crystal light adjusting layer (that is, the light extracting structure 200 extracts the light in the light guide plate); in addition, the display device may not be provided with a separate base substrate for the array substrate, the light guide plate 100 is used as the base substrate, the liquid crystal light adjusting layer 400 is directly arranged on the first low refractive index layer 300, and the second low refractive index layer 500 is arranged on the side of the liquid crystal light adjusting layer 400 away from the light guide plate 100, so that the liquid crystal light adjusting layer 400, the first low refractive index layer 300 and the second low refractive index layer 500 cooperate to form another optical waveguide. When a reference voltage (a first voltage) is applied to the driving electrodes, the liquid crystal light adjusting layer has the initial refractive index. In this case, the refractive index of the first low refractive index layer 300 and the refractive index of the second low refractive index layer 500 is smaller than the refractive index of the liquid crystal light adjusting layer 400. In this way, light emitted from the first low refractive index layer can be totally reflected in the liquid crystal light adjusting layer 400 (upper and lower interfaces of the total reflection of the light are respectively the surface on the side of the first low refractive index layer 300 close to the liquid crystal layer and the surface on the side of the second low refractive index layer 500 close to the liquid crystal layer), in this case, no light is emitted from the liquid crystal light adjusting layer 400, and a dark state of display is achieved (the dark state displayed by the display device refers to that there is no light emitted from the display surface of the display device); when a second voltage is applied to the driving electrodes 402 in the liquid crystal light adjusting layer 400, the liquid crystal grating formed by the liquid crystal layer 401 enables light emitted from the first low refractive index layer to the liquid crystal light adjusting layer to be deflected, and then the total reflection condition of the light in the liquid crystal light adjusting layer is deteriorated, so that light is emitted from a side of the second low refractive index layer 500 away from the liquid crystal light adjusting layer (A in FIG. 3 represents a region corresponding to a sub-pixel region), to achieve display of gray levels (the gray levels displayed by the display device means that light is emitted from the display surface of the display device, and the gray level is different as the amount of light emitted is different), and by adjusting electrical signals applied to the driving electrodes of the liquid crystal molecules, change of the shape of the liquid crystal grating can be controlled, and the diffraction efficiency of the liquid crystal grating to the incident light can be changed, thereby changing the amount of light emitted from the second low refractive index layer to achieve display of arbitrary gray level between L0 to L255.

It can be seen that, the display device provided by the present disclosure can realize the dark state of display by means of total reflection without the need of providing a polarizer, and the gray level as displayed can be controlled by change of voltage applied to the driving electrodes, thereby improving the influence of the polarizer on the light transmittance of the display device in the related technologies.

It should be noted that, in the above solution, the light guide plate is an edge-type light guide plate, the light exiting surface provides an area light source for the display device, and the light incident side is a side surface of the light guide plate between the bottom surface and the light exiting surface.

In addition, it should be noted that in the above solution, the initial refractive index of the liquid crystal light adjusting layer is a refractive index of the liquid crystal light adjusting layer when a reference voltage is applied to the driving electrodes. The reference voltage may be a preset driving voltage, for example, the reference voltage is 0 v, that is, when the driving electrodes are not powered, the liquid crystal is not deflected at this time, the liquid crystal light adjusting layer is in an initial state and has the initial refractive index; in some special cases, when a certain voltage is applied to the driving electrodes (the specific voltage value may be set according to actual use), that is, when the liquid crystal has a certain deflection angle, it is considered as the initial state of the liquid crystal, and the refractive index of the liquid crystal layer at this time is taken as the initial refractive index.

In addition, in the above solution, the light extracting structure causes light that is propagated in a totally reflected manner in the light guide plate to exit from the light exiting surface of the light guide plate at a predetermined angle. The meaning of the preset angle is that, the light extracting structure 200 can diffract the light incident thereon at a certain diffraction angle, and the diffraction angle is related to the incident angle of the light and the wavelength of the light.

In addition, it should be noted that a display device is also proposed in the related technologies. A light extracting grating is provided on a side of a light exiting surface of a light guide plate, light propagating through total reflection in the light guide plate is taken out and incident into the liquid crystal light adjusting layer, A light shielding layer needs to be provided on a color filter substrate of the liquid crystal light adjusting layer. Opening regions in an array are arranged on the light shielding layer. A color filter is arranged in the opening region. When no voltage is applied to the driving electrodes of the liquid crystal molecules in the liquid crystal light adjusting layer, the liquid crystal molecules are not deflected, the light extracted by the light extracting grating is incident on the light shielding region of the light shielding layer. At this time, the light is absorbed by the light shielding layer and no light for display is emitted, which refers to the dark state. When a certain voltage signal is applied to the driving electrodes of the liquid crystal molecules, the liquid crystal molecules are periodically arranged to form a liquid crystal grating. Using the diffraction of the liquid crystal grating, the light extracting from the light extracting grating is incident on the opening regions on the light shielding layer, displaying a gray level of L255. By controlling the electrical signal applied to the driving electrodes of the liquid crystal molecules, the diffraction efficiency of the liquid crystal grating for the incident light can be different, thereby realizing display of arbitrary gray level between L0 to L255. Such a liquid crystal display device structure requires a black light shielding layer to block incident light to achieve a dark state, which will greatly reduce the aperture ratio of the display device. In addition, due to the presence of the color filter, light diffracted by the liquid crystal grating cannot completely exit from the opening region, which also limits the light efficiency of the overall device. When applied to transparent display, the above two problems will greatly affect transparency and brightness.

The display device provided by the embodiments of the present disclosure can realize display of the dark state by means of total reflection without the need of providing a light shielding layer, thereby improving the influence of the light shielding layer on the aperture ratio and light transmittance of the display device.

In addition, it should be noted that in the related technologies, the liquid crystal display device generally includes a color filter substrate, an array substrate, and a liquid crystal layer between the two substrates. The color filter substrate includes a base substrate and an upper alignment layer arranged on the base substrate. The array substrate includes a base substrate and a thin film transistor, a pixel electrode, a common electrode (the common electrode may be provided on the color filter substrate), a gate line, a data line, and a lower alignment film which are arranged on the base substrate.

Figure 2:
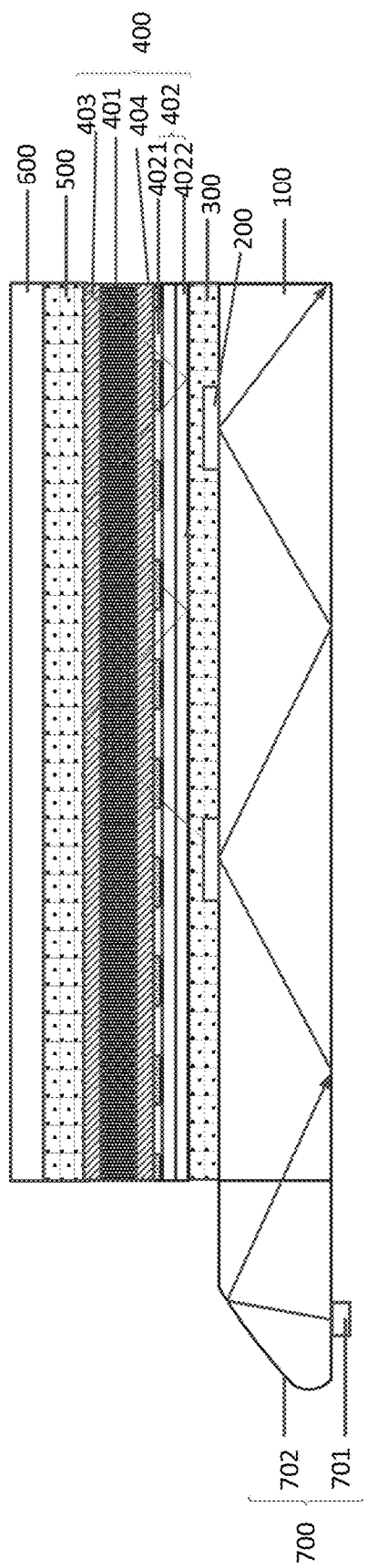
FIG. 2 is a schematic structural diagram of a display device provided in another exemplary embodiment of the present disclosure when the display device is in a dark state.

The liquid crystal light adjusting layer 400 may include various layers other than the base substrate of the color filter substrate, the color filter of the color filter substrate, a black matrix of the color filter substrate, and the base substrate of the array substrate. For example, as shown in FIG. 1 to FIG. 3, in the display device provided in the embodiments of the present disclosure, the liquid crystal light adjusting layer 400 may include a liquid crystal layer 401 and driving electrodes 402, and may further include a first alignment layer 404 on a side of a liquid crystal layer arranged near the first low refractive index layer, and a second alignment layer 403 on a side of the liquid crystal layer near the second low refractive index layer; and display device structures such as an insulating layer 406, a thin film transistor, a gate line, and a data line. The insulating layer 406, the thin film transistor, the gate line, and the data line may be arranged on a side of the liquid crystal layer away from the second low refractive index layer.

Furthermore, in the display device provided by the embodiments of the present disclosure, the display device includes multiple pixel regions distributed in an array, and each of the pixel regions includes multiple sub-pixel regions. Exemplarily, the driving electrodes 402 may include:

a first electrode, including multiple first sub-electrodes 4021 provided in one-to-one correspondence with the sub-pixel regions; and a second electrode 4022, arranged opposite to the first electrode;

The second electrode 4022 is an entire block of electrode corresponding to the multiple the first sub-electrodes 4021;

Or, the second electrode 4022 includes multiple second sub-electrodes, and each of the second sub-electrodes is arranged corresponding to at least one of the first sub-electrodes.

For example, the first electrode is a pixel electrode, and the second electrode is a common electrode.

The first electrode may be arranged on a side of the liquid crystal light adjusting layer away from the second low refractive index layer, and the second electrode may be arranged on a side of the liquid crystal light adjusting layer away from the first low refractive index layer or a side of the liquid crystal light adjusting layer close to the first low refractive index layer.

As shown in FIG. 1, when the first electrode and the second electrode are arranged on the same side of the liquid crystal light adjusting layer, the liquid crystal light adjusting layer may further include an insulating layer 406 between the first electrode and the second electrode.

In addition, in the embodiments provided by the present disclosure, the light extracting structure includes multiple light extracting gratings distributed in an array, and each of the light extracting gratings is arranged corresponding to a sub-pixel region.

With the above solution, the light extracting structure is implemented by using light extracting gratings, which are arranged in an array and are arranged in the sub-pixel regions in one-to-one correspondence, so that light exiting from the light guide plate at the position corresponding to each sub-pixel region is incident into the liquid crystal light adjusting layer.

It should also be noted that the display device of the present disclosure may be a display panel or an entire display apparatus including a display panel.

In addition, the first low refractive index layer and the second low refractive index layer each may be made of organic or inorganic transparent material with a low refractive index, for example, may be formed with organic siloxane or inorganic silicon oxide.

In an exemplary embodiment provided by the present disclosure, as shown in FIG. 1, the display device includes a base substrate arranged on a side of the liquid crystal layer 401 away from the light guide plate 100. The base substrate may be directly made of a low refractive index material to form the second low refractive index layer 500. In this case, the base substrate may be made of an organic or inorganic transparent material with a low refractive index, for example, may be formed with an organic siloxane or an inorganic silicon oxide;

Optionally, in another exemplary embodiment provided by the present disclosure, as shown in FIG. 2, the display device includes both the second low refractive index layer 500 and a base substrate 600 separately provided on a side of the second low refractive index layer 500 away from the liquid crystal light adjusting layer 400.

In addition, in an exemplary embodiment provided by the present disclosure, as shown in FIG. 1 to FIG. 3, the display device further includes a light source 700, and the light source 700 is arranged on the light incident side of the light guide plate 100, and is configured to emit light into the light guide plate 100.

Optionally, the light source 700 is a collimated light source, and is configured to emit collimated light into the light guide plate 100 at a predetermined angle so as to perform propagation in a totally reflected manner in the light guide plate 100.

The collimated light source is adopted as the light source 700, and compared with other types of light sources, the light rays as provided are collimated, and incident angles of the light rays incident on the light guide plate 100 are the same. The critical angle of total reflection in the light guide plate 100 is related to the incident angle of the light, and the diffraction angle of the light extracted from the light extracting structure 200 is related to the incident angle of the totally reflected light incident on the light extracting structure 200. Therefore, the use of collimated light is more conducive to determination of parameters such incident angle of light coupling into the light guide plate 100, the internal total reflection angle of the light guide plate 100, and the diffraction angle of the light extracting structure 200.

In order to facilitate understanding, a case where the light source 700 is a collimated light source is taken as an example to describe the display device provided in the embodiments of the present disclosure in detail.

Figure 4:
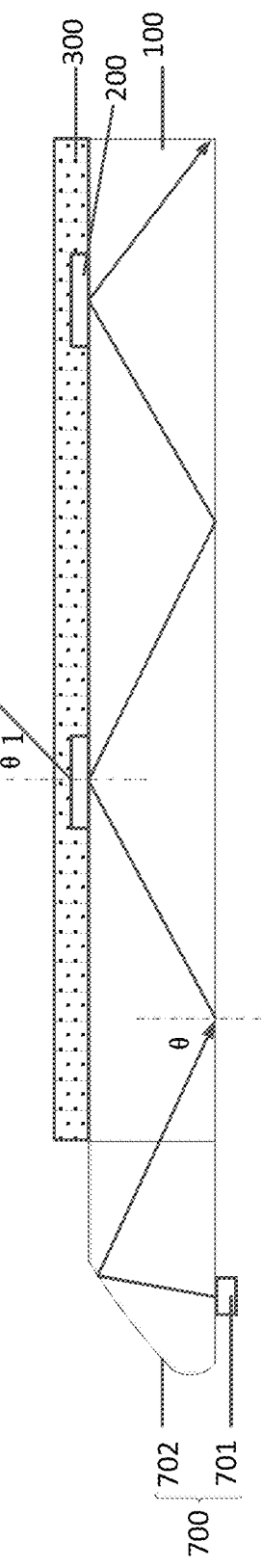
FIG. 4 is a schematic diagram of light path of totally reflected light in a light guide plate in a display device according to an exemplary embodiment of the present disclosure.

FIG. 4 is a schematic diagram showing the principle of the light emitted by the light source 700 entering the light guide plate 100 so as to be propagated in a totally reflected manner. As shown in FIG. 4, the total reflection critical angle θ' in the light guide plate 100 satisfies the following relationship:

$$n1 \sin \theta' = n2 \tag{I}$$

$$\theta' = \arcsin\left(\frac{n2}{n1}\right) \tag{II}$$

In the formula, n1 represents the refractive index of the light guide plate 100;

n2 represents the refractive index of the first low refractive index layer 300;

θ' represents the critical angle of total reflection of light in the light guide plate 100.

Since the light emitted by the light source 700 is propagated in the light guide plate 100 in a totally reflected manner, it can be known from the above formula (I) and formula (II) that, when the light propagated in the light guide plate 100 in the totally reflected manner is incident on the light extracting structure 200, the incident angle θ needs to satisfy the following formula:

$$\theta \geq \arcsin\left(\frac{n2}{n1}\right) \quad \text{(III)}$$

In addition, it should be noted that, in the above solution, the light extracting structure 200 may use multiple light extracting gratings arranged in an array, a grating period P of the light extracting grating and a diffraction angle θ1 of an m-order diffraction wave of the light extracting grating, the wavelength λ, of the incident light, and the incident angle θ satisfy the following relationship:

$$\sin\theta - \sin\theta1 = m\lambda/P \quad \text{(IV)}$$

where m=0, ±1, ±2 . . . ±N, and N is a positive integer.

It can be known from the above formula (IV) that the period P of the grating may be calculated based on the incident angle θ, the wavelength λ of the incident light, and the diffraction angle θ1 of the light extracting structure 200.

In an exemplary embodiment, the light extracting grating is a transmission grating arranged on the light exiting surface of the light guide plate. In this case, the first low refractive index layer may also function as a planarization layer. Exemplarily, m is the diffraction order of the light extracting grating, and when m is 1 (that is, the diffraction order of the light extracting grating is the 1st order), a part of the totally reflected light will be transmitted and be extracted from the light guide plate by the light extracting grating, and the other part of the light that is not extracted by the light extracting grating, the reflected light R0, continues to propagate in the light guide plate at a total reflection angle. In other embodiments, the light extracting grating may be a reflection grating, which is arranged on the bottom surface of the light guide plate.

Figure 5:
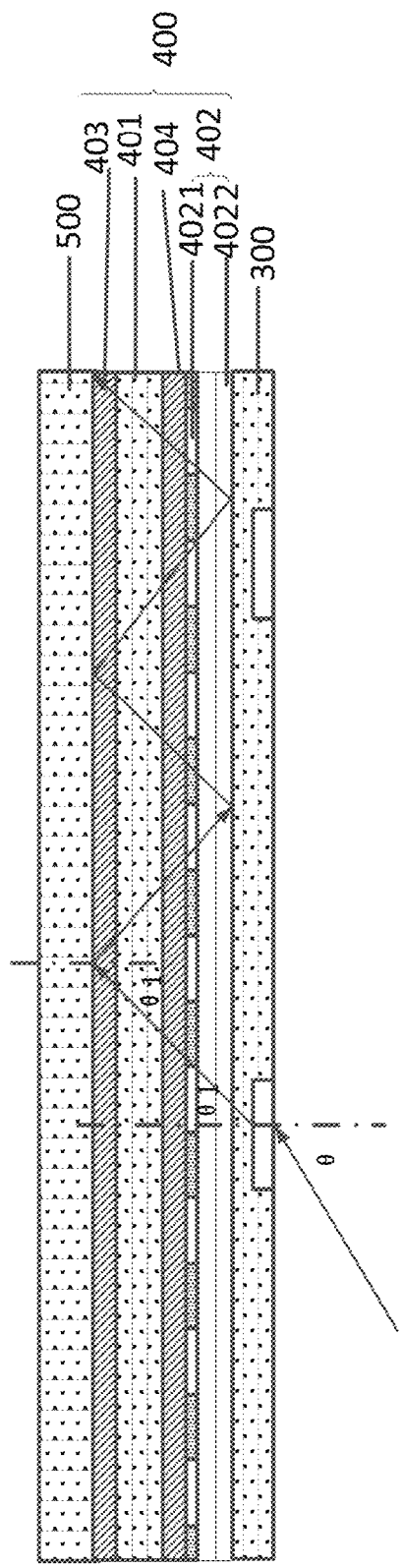
FIG. 5 is a schematic diagram of light path of totally reflected light in a liquid crystal light adjusting layer in a display device according to an exemplary embodiment of the present disclosure.

In addition, as shown in FIG. 5, the liquid crystal light adjusting layer 400 is between the first low refractive index layer 300 and the second low refractive index layer 500, forming an optical waveguide (hereinafter referred to as a liquid crystal light adjusting layer optical waveguide), so that the light extracted from the light extracting structure 200 can be totally reflected in the liquid crystal light adjusting layer optical waveguide. Therefore, the condition that the liquid crystal light adjusting layer optical waveguide needs to meet is that:

the diffraction angle θ1 of the light extracted from the light extracting structure 200 is greater than the critical angle θ″ of total reflection of the liquid crystal light adjusting layer optical waveguide, and it is assumed that the refractive index of the liquid crystal light adjusting layer 400 is set to n4, the refractive index of the first low refractive index layer 300 is n2, and the refractive index of the second low refractive index layer 500 is n3, then, when the refractive index n3 of the second low refractive index layer 500 is less than n2, $$n4\sin\theta'' = n3 \quad \text{(V)}$$

$$\theta'' = \arcsin\left(\frac{n3}{n4}\right) \quad \text{(VI)}$$

thus, the diffraction angle θ1 of the light extracted from the light extracting structure 200 is:

$$\theta1 \geq \arcsin\left(\frac{n3}{n4}\right);$$

in addition, when the refractive index n3 of the second low refractive index layer 500 is greater than n2, then the diffraction angle θ1 of the light extracted from the light extracting structure 200 is:

$$\theta \geq \arcsin\left(\frac{n2}{n4}\right).$$

It can be seen that, in the display device provided in the embodiments of the present disclosure, to achieve a dark state of display, the diffracted light extracted from the extracting structure 200 is totally reflected in the liquid crystal light adjusting layer 400 when a reference voltage is applied to the driving electrodes 402 (for example, when no voltage is applied). It needs to be met that the refractive index n4 of the liquid crystal light adjusting layer 400 is greater than the refractive index n2 of the first low refractive index layer 300 and the refractive index n3 of the second low refractive index layer 500, and the diffraction angle θ1 of the light extracted by the light extracting structure 200 satisfy the following condition:

when the refractive index n3 of the second low refractive index layer 500 is less than n2, then the diffraction angle θ1 of the light extracted from the light extracting structure 200 is:

$$\theta1 \geq \arcsin\left(\frac{n3}{n4}\right);$$

when the refractive index n3 of the second low refractive index layer 500 is greater than n2, then the diffraction angle θ1 of the light extracted from the light extracting structure 200 is:

$$\theta \geq \arcsin\left(\frac{n2}{n4}\right).$$

The refractive index n4 of the liquid crystal light adjusting layer 400 may be calculated through simulation experiment, and the refractive index n4 is an equivalent refractive index of multiple layers of structures in the liquid crystal light adjusting layer 400 including the liquid crystal layer, the driving electrodes, the first alignment layer, the second alignment layer, etc.

In addition, it should be noted that, as shown in FIG. 3, when a second voltage is applied to the driving electrodes 402 in the liquid crystal light adjusting layer 400, the liquid crystal layer 401 forms a phase pattern distribution of a liquid crystal grating, so that propagation direction and angle of the light are changed. In this way, the total reflection of the light in the light guide of the liquid crystal light adjusting layer is destroyed, and the light is scattered and emitted, realizing a gray state of display. It should be understood that, in this case, the liquid crystal grating formed by the liquid crystal light adjusting layer 400 can change the propagation direction of the light and emit the light from the second low refractive index layer 500, and the exit angle of depends on the shape of the liquid crystal grating as formed, that is, depending on the electrical signal applied to the driving electrodes 402.

Figure 6:
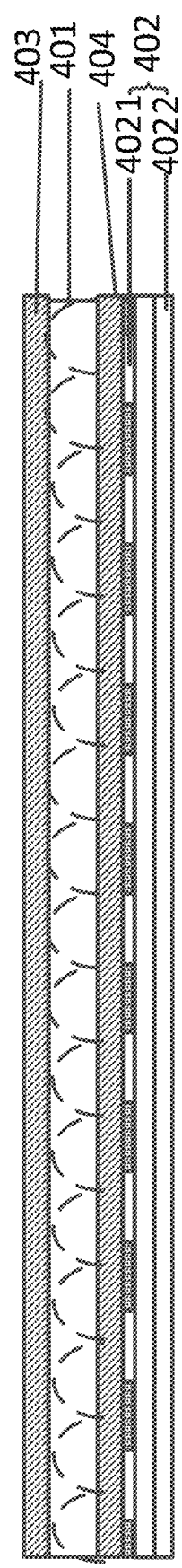
FIG. 6 is a schematic diagram showing formation of a liquid crystal grating in gray level display in a display device provided by an exemplary embodiment of the present disclosure shown in FIG. 4.

The specific structure of the driving electrodes 402 in the liquid crystal light adjusting layer 400 may be various. Taking the electrode form shown in FIG. 6 as an example, the driving electrodes 402 shown in FIG. 6 are ADS mode electrodes. The second electrode 4022 is provided as a whole block. The first electrode includes first sub-electrodes 4021 arranged in an array. One of the first sub-electrodes 4021 includes multiple grating-like electrodes. For example, two liquid crystal grating structures may be formed in one first sub-electrode 4021, in which case the period size (pitch) of the formed liquid crystal grating is relatively small, and the diffraction efficiency is obvious. In practical applications, one liquid crystal grating structure may be formed for multiple first sub-electrodes 4021.

In addition, in the related technologies, a color filter is provided on a color filter substrate of a liquid crystal display device to implement color display. Due to the existence of the color filter, for a display device, especially for a transparent display device, light transmittance and brightness of the display device are greatly affected. In view of the above problem, in the display device provided by the present disclosure, color display can be realized by a time division driving manner without the need of providing a color filter. The following describes two exemplary embodiments of the display device provided by the present disclosure.

Figure 7:
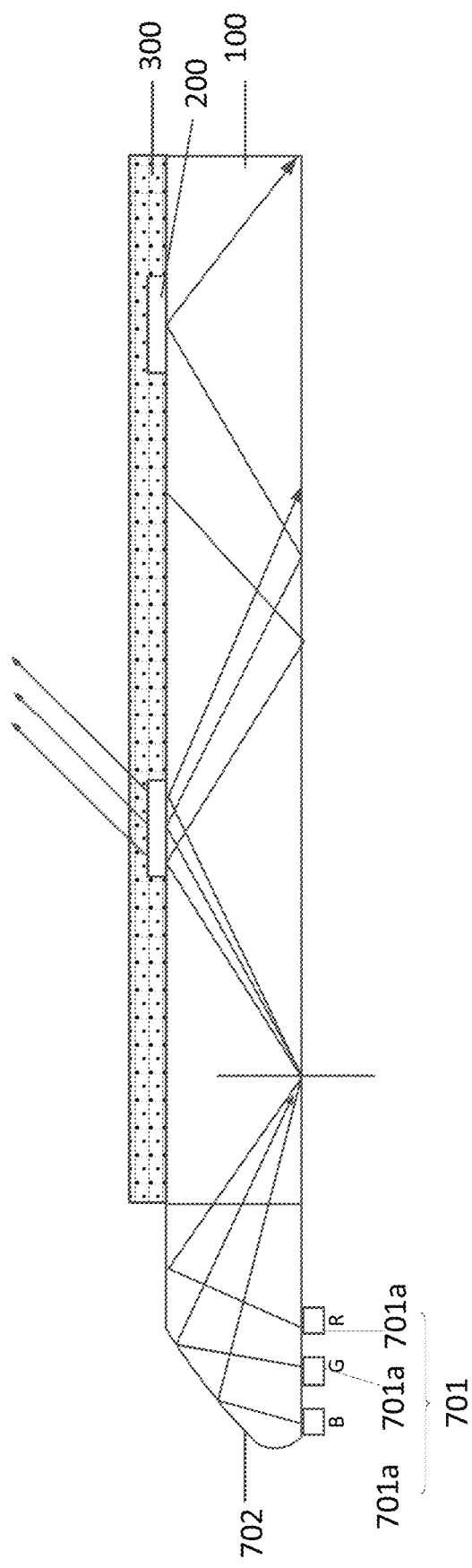
FIG. 7 is a schematic structural diagram of a display device provided in an exemplary embodiment of the present disclosure when color display is implemented, where only a light source, a light guide plate, a light extracting structure, and a first low refractive index are illustrated.

FIG. 7 is a schematic structural diagram of an exemplary embodiment of a display device capable of implementing color display provided in the present disclosure, where only the light source, the light guide plate, the light extracting structure, and the first low refractive index layer are illustrated in the figure, and structures, such as the liquid crystal light adjusting layer and the second low refractive index layer, are not illustrated. As shown in FIG. 7, in an exemplary embodiment, the light source 700 includes:

a first light source component 701, arranged on a side of the light incident side of the light guide plate 100, where the first light source component 701 includes multiple monochromatic light sources 701a for emitting multiple monochromatic lights with different colors, and the multiple monochromatic lights with different colors can be mixed into white light; and a first light adjusting component 702, arranged between the first light source component 701 and the light incident side of the light guide plate 100; where, among the multiple monochromatic light sources 701a, the monochromatic light sources 701a corresponding to the monochromatic lights with different colors are in different positions or have different light exiting angles, so that the monochromatic lights with different colors are incident into the light guide plate 100, via the first light adjusting component 702, at different preset angles to perform transmission in a totally reflected manner and are emitted from the light exiting surface of the light guide plate at a same exit angle by the light extracting structure 200.

In the above exemplary embodiments, the light source 700 uses the multiple monochrome light sources 701a to provide display color information for the display device, and the first light adjusting component 702 is configured to adjust light emitted from each of the monochrome light sources 701a to enable the light emitted from each of the monochromatic light sources 701a to be coupled into the light guide plate 100 for propagation in a totally reflected manner. Optionally, the first light adjusting component 702 is capable of adjusting the light of each of the monochromatic light sources 701a to be collimated light, and enabling the collimated lights with the various colors to be incident into the light guide plate 100 at different predetermined angles, so as to ensure that incident angles of the collimated lights with the various colors are the same when they are incident on the light extracting structure 200. As a result, it is ensured that the diffraction angles of the lights extracted through the light extracting structures 200 from the lights with the various colors are the same, and then the lights can all be propagated in a totally reflected manner in the liquid crystal light adjusting layer 400. Since the diffraction angle of the light extracting structure 200 is related to the wavelength of the light and the incident angle of the light incident on the light extracting structure 200, the positions of the monochromatic light sources 701a with the different colors may be reasonably designed, or the light exiting angles of the monochromatic light sources 701a with the different colors may be reasonably designed, to enable the monochromatic lights with the different colors to be coupled into the light guide plate 100 at different preset angles by the first light adjusting component 702 for propagation in a totally reflected manner and to be extracted by the light extracting structure 200 at the same exit angle through diffraction.

In addition, as shown in FIG. 7, the monochromatic light source 701a may be an LED lamp, the first light adjusting component 702 includes a first reflective surface, and the first reflective surface faces a light exiting surface of the light source component. The first reflective surface has a first preset shape, and the first preset shape enables the monochromatic lights with different colors from light emitted by the first light source component to be incident into the light guide plate at different preset angles to perform transmission in a totally reflected manner, and to be emitted from the light exiting surface of the light guide plate at the same exit angle by the light extracting structure.

The first reflective surface may be one of a reflective plane and/or a reflective paraboloid, or may include both the reflective plane and the reflective paraboloid (for example, as shown in FIG. 7). The first reflective surface has a first preset shape, and its specific shape parameters, such as the specific setting positions of the reflective plane and the reflective paraboloid, the tilt angle of the reflective plane, and the curvature of the reflective paraboloid, may be obtained through reasonable adjusting, as long as the following can be met: the monochromatic lights with different colors from light emitted by the first light source component can be incident into the light guide plate at different preset angles to perform transmission in a totally reflected manner, and be emitted from the light exiting surface of the light guide plate at the same exit angle by the light extracting structure.

For example, the first light adjusting component may adopt a reflective lampshade, and large-angle light rays emitted from the LED lamp enter the light guide plate 100 after being gathered by the reflection lampshade, and propagate in the light guide plate 100 at a propagation angle $\theta'$ of total reflection. It can be understood that, in practical applications, the structure of the first light adjusting component 702 is not limited thereto.

In the above exemplary embodiments, the display device further includes:

a light source control unit, connected to the light source 700 and configured to drive the monochrome light sources 701*a* corresponding to monochromatic lights with different colors in the light source 700 in a time division manner, where driving voltages on the monochrome light sources 701*a* corresponding to the monochromatic lights with different colors are the same, so that the monochromatic lights with the colors have a same brightness; and a liquid crystal light adjusting layer control unit, connected to the driving electrodes 402, and configured to drive the driving electrodes 402 in a time division manner, and control to apply different voltages in different time periods to the driving electrodes 402 corresponding to the different sub-pixel regions in each pixel region.

Figure 8:
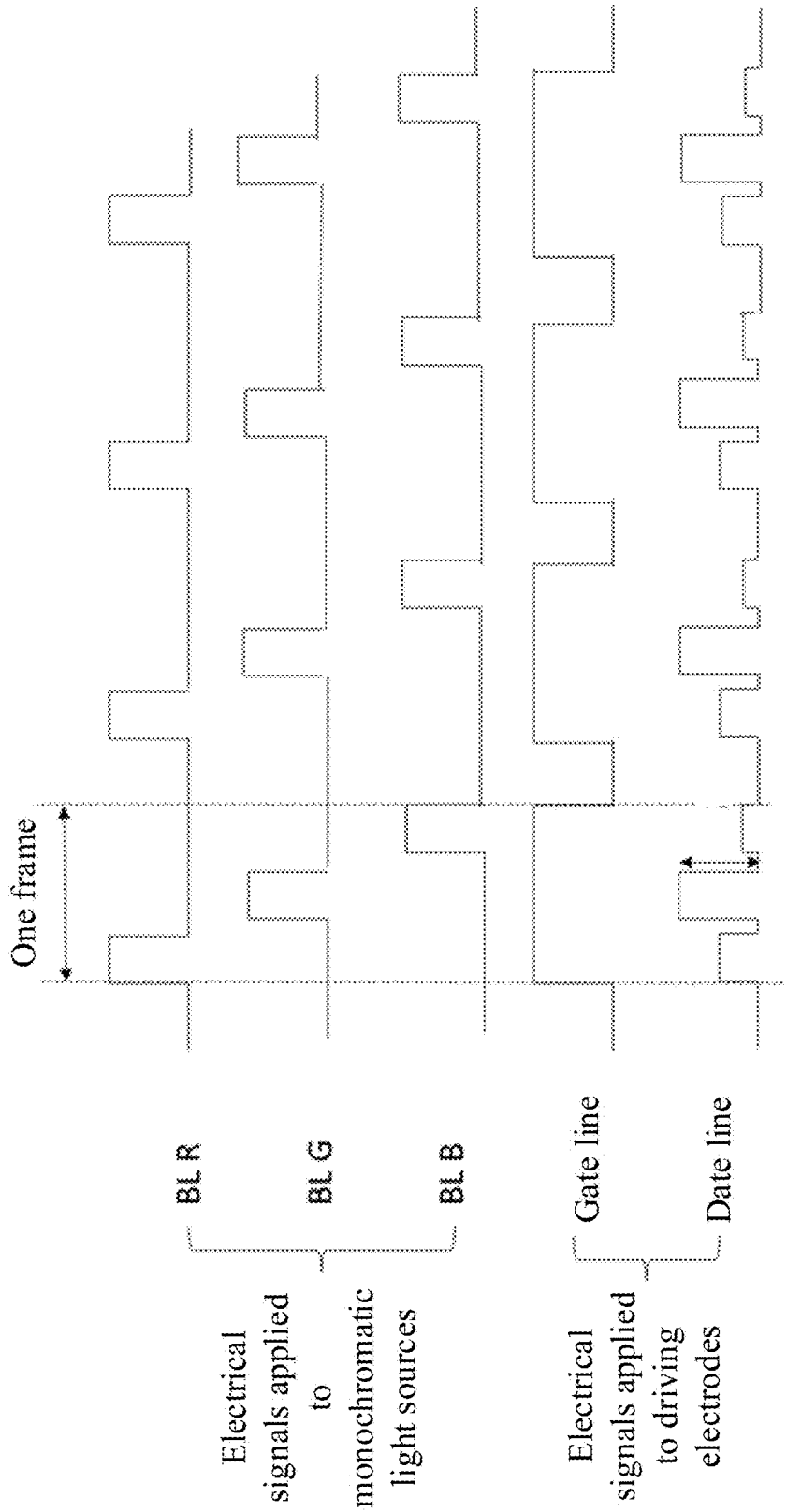
FIG. 8 shows a timing control diagram of an embodiment of electrical signals applied to the light source and the liquid crystal light adjusting layer when the display device provided by the present disclosure implements color display.

In the above solution, the light source 700 provides monochromatic lights with multiple colors, and the light source 700 is driven by the light source control unit in a time division manner. As shown in FIG. 8, a case where the light source 700 provides lights with three colors of red (R), green (G) and blue (B) is taken as an example, within 1 frame time, the driving time of each of the red light source, green light source and blue light source takes ⅓ of the time, and the red light source, the green light and the blue light source are controlled to have the same brightness; and the liquid crystal light adjusting layer control unit drives the driving electrodes 402 in a time division manner, and controls the gray levels as displayed by controlling electrical signals applied to the driving electrodes 402 corresponding to different sub-pixel regions. Specifically, as shown in FIG. 8, the driving electrodes 402 may be provided with electrical signals via data lines (Data), within 1 frame time, the gate lines (Gate) are all turned on, and the data lines (Data) in 1 frame time apply different signals for time periods corresponding to different colors so as to control voltages applied to the driving electrodes 402 to be different, in this way, for the time periods in which lights with different colors are respectively emitted, the shape of the liquid crystal grating is different, and the liquid crystal grating has different diffraction efficiencies for lights with different colors. As a result, the displayed gray levels of different colors are controlled. FIG. 8 is a schematic diagram of white light display, in which case the ratio of the signal strengths of the data lines is approximately R:G:B=3:6:1.

In another exemplary embodiment of the present disclosure, as shown in FIG. 7, the light source 700 includes:

a first light source component 701, arranged on a side of the light incident side of the light guide plate 100, where the first light source component 701 includes multiple monochromatic light sources 701*a* for emitting multiple monochromatic lights with different colors, and the multiple monochromatic lights with different colors can be mixed into white light; and a first light adjusting component 702, arranged between the first light source component 701 and the light incident side of the light guide plate 100; where, among the multiple monochromatic light sources, the monochromatic light sources 701*a* corresponding to the monochromatic lights with different colors are in different positions or have different light exiting angles, so that the monochromatic lights with different colors are incident into the light guide plate 100, via the first light adjusting component 702, at different preset angles to perform transmission in a totally reflected manner and are emitted from the light exiting surface of the light guide plate at a same exit angle by the light extracting structure 200.

In the above exemplary embodiments, the light source 700 uses the multiple monochrome light sources 701*a* to provide display color information for the display device, and the first light adjusting component 702 is used to adjust light emitted from each of the monochrome light sources 701*a* to enable the light emitted from each of the monochromatic light sources 701*a* to be incident into the light guide plate 100 for propagation in a totally reflected manner. Optionally, the first light adjusting component 702 is capable of adjusting the light of each of the monochromatic light sources 701*a* to be collimated light, and enabling the collimated lights with the various colors to be incident into the light guide plate 100 at different predetermined angles, so as to ensure that incident angles of the collimated lights with the various colors are the same when they are incident on the light extracting structure 200. As a result, it is ensured that the diffraction angles of the lights extracted through the light extracting structures 200 from the lights with the various colors are the same, and then the lights can all be propagated in a totally reflected manner in the liquid crystal light adjusting layer 400. The positions of the monochromatic light sources 701*a* with the different colors may be reasonably designed, or the light exiting angles of the monochromatic light sources 701*a* with the different colors may be reasonably designed, to enable the monochromatic lights with the different colors to be coupled into the light guide plate 100 at different preset angles by the first light adjusting component 702 for propagation in a totally reflected manner and to be extracted by the light extracting structure 200 at the same exit angle through diffraction.

In addition, as shown in FIG. 7, the monochromatic light source 701*a* may be an LED lamp, the first light adjusting component 702 includes a first reflective surface, and the first reflective surface faces a light exiting surface of the light source component. The first reflective surface has a first preset shape, and the first preset shape enables the monochromatic lights with different colors from light emitted by the first light source component to be incident into the light guide plate at different preset angles to perform transmission in a totally reflected manner, and to be emitted from the light exiting surface of the light guide plate at the same exit angle by the light extracting structure.

The first reflective surface may be one of a reflective plane and/or a reflective paraboloid, or may include both the reflective plane and the reflective paraboloid (for example, as shown in FIG. 7). The first reflective surface has a first preset shape, and its specific shape parameters, such as the specific setting positions of the reflective plane and the reflective paraboloid, the tilt angle of the reflective plane, and the curvature of the reflective paraboloid, may be obtained through reasonable adjusting, as long as the following can be met: the monochromatic lights with different colors from light emitted by the first light source component can be incident into the light guide plate at different preset angles to perform transmission in a totally reflected manner, and be emitted from the light exiting surface of the light guide plate at the same exit angle by the light extracting structure.

For example, the first light adjusting component may adopt a reflective lampshade, and large-angle light rays emitted from the LED lamp enter the light guide plate 100 after being gathered by the reflection lampshade, and propagate in the light guide plate 100 at a propagation angle θ of total reflection. It can be understood that, in practical applications, the structure of the first light adjusting component 702 is not limited thereto.

In the above exemplary embodiments, the display device further includes:

a liquid crystal light adjusting layer control unit, connected to the driving electrodes 402, and configured to drive the driving electrodes 402 in a time division manner, where voltages applied to the driving electrodes 402 corresponding to the various sub-pixel regions in different time periods are the same; and a light source control unit, connected to the light source 700, and configured to drive the monochrome light sources 701a corresponding to the monochromatic lights with different colors in the light source 700 in a time division manner. The driving voltages on the monochromatic lights sources 701a corresponding to the monochromatic lights with different colors are different.

Figure 9:
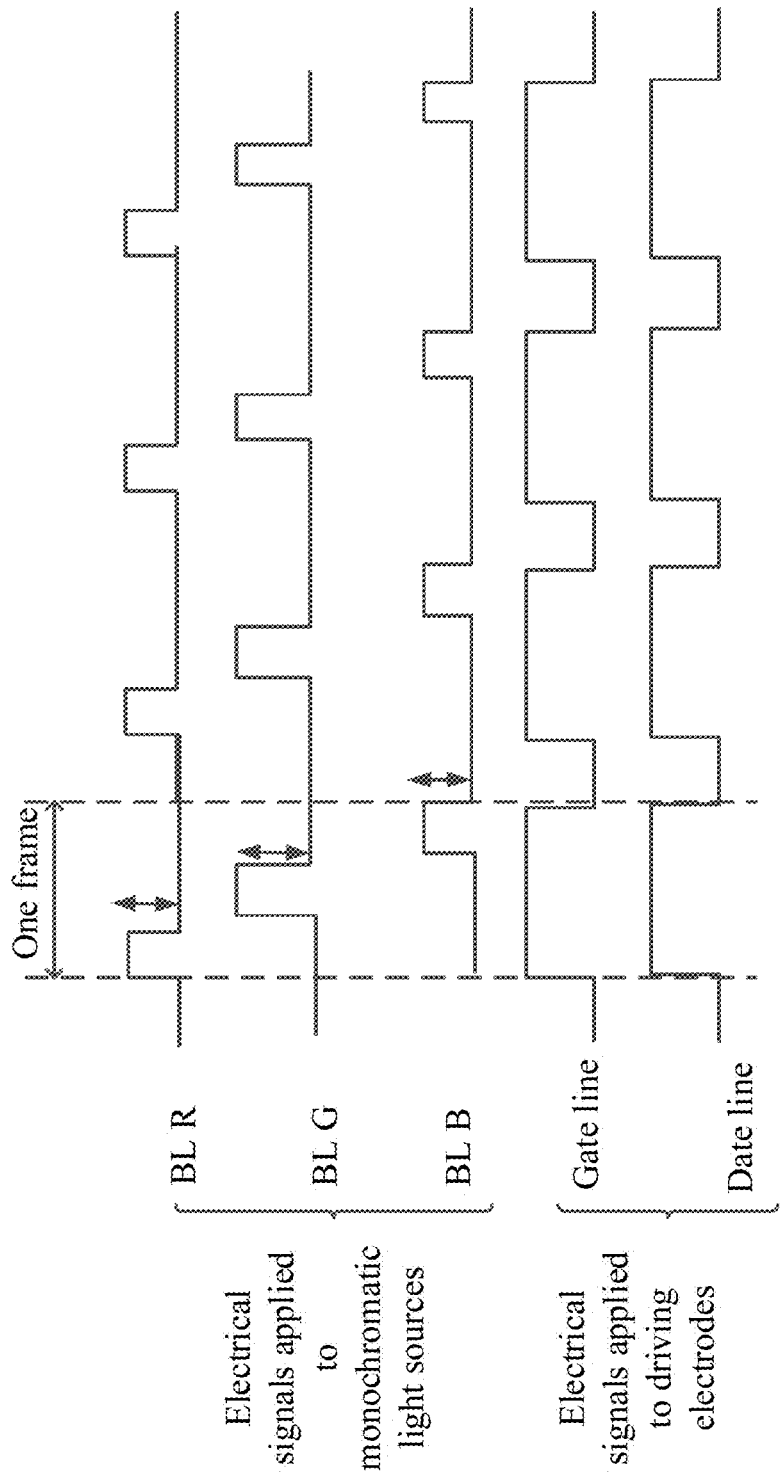
FIG. 9 shows a timing control diagram of another embodiment of electrical signals applied to the light source and the liquid crystal light adjusting layer when the display device provided by the present disclosure implements color display.

In the above solution, the light source 700 provides monochromatic lights with multiple colors, and the light source 700 is driven by the light source control unit in a time division manner. As shown in FIG. 9, a case where the light source 700 provides lights with three colors of red (R), green (G), and blue (B) is taken as an example. In one frame time, the driving time of each of the red light source, the green light source, and the blue light source takes ⅓ of the time. By applying different voltages to the monochromatic light sources 701a with the various colors, the lights with different colors have different brightnesses. The liquid crystal light adjusting layer control unit drives the driving electrodes 402 in a time division manner, the electrical signals applied on the driving electrodes 402 corresponding to the sub-pixel regions in different time periods are the same (as shown in FIG. 9, Gate and Data are all turned on), and the driving electrodes 402 only serve as a switch (that is, no voltage is applied in the dark state, the liquid crystal is controlled not to be deflected, and voltage is applied in the gray level state to control the deflection of the liquid crystal). In this way, the displayed gray levels are controlled by controlling the brightnesses of the monochromatic light sources 701a with the various colors to be different.

In the display devices provided in the above two exemplary embodiments, by designing the monochromatic light sources 701a with the multiple colors and adopting a time division control method, color display can be realized without providing a color filter, which greatly improves light transmittance and brightness of the display device.

In addition, in another exemplary embodiment provided by the present disclosure, the display device may also implement directional color display, which is applied to a near-eye display device. For the near-eye display device, the positions of the display screen and the human eyes are fixed, the light emitting angle of each sub-pixel on the display device to the human eye is also fixed, and for a fixed pixel, the light exiting angles of the RGB sub-pixels will be different since the positions of the RGB sub-pixels are different.

Figure 10:
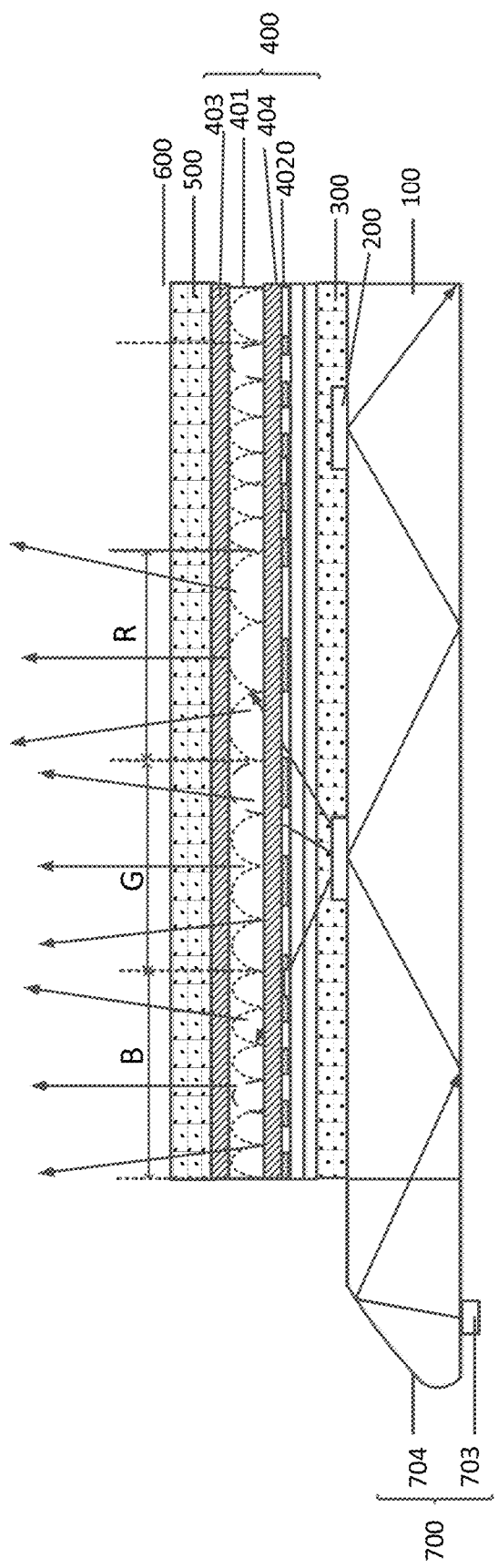
FIG. 10 is a schematic structural diagram of an exemplary embodiment of a gray level state when a display device provided by the present disclosure is applied to a directional display.

As shown in FIG. 10, in the present exemplary embodiments, the light source 700 includes: a second light source component 703, arranged on a side of the light incident side of the light guide plate 100 and configured to emit white light; and a second light adjusting component 704, arranged between the second light source component 703 and the light incident side of the light guide plate 100, and configured to enable the white light emitted by the second light source component 703 to be coupled into the light guide plate 100 so as to be propagated in a totally reflected manner, and to be emitted from the light exiting surface of the light guide plate at different angles by the light extracting structure 200 so as to be split into multiple monochromatic lights with different colors, where the multiple monochromatic lights is incident on the multiple sub-pixel regions in a one-to-one correspondence;

where the driving electrodes includes multiple first sub-electrodes 4021 which are arranged in a one-to-one correspondence with the sub-pixel regions, each of the multiple first sub-electrodes 4021 includes multiple grating-like electrodes 4020, and in the same pixel region, the grating-like electrodes 4020 in the first sub-electrodes corresponding to different sub-pixel regions have different arrangement periods.

In the above solution, the second light source component 703 may include a white light source, and the second light adjusting component 704 is configured to enable the white light emitted by the white light source to be incident into the light guide plate 100 at a predetermined angle for total reflection propagation. Optionally, the second light adjusting component 704 adjusts the white light emitted by the white light source to be collimated light, and enables the light to be incident into the light guide plate 100 for total reflection propagation. The white light source may be an LED light. The second light adjusting component 704 includes a second reflective surface, the second reflective surface is arranged facing a light exiting surface of the second light source component, the second reflective surface has a second preset shape, and the second preset shape enables the white light emitted by the second light source component to enter the light guide plate so as to be propagated in a totally reflected manner.

The second reflective surface may be one of a reflective plane or a reflective paraboloid, or may include both a reflective plane and a reflective paraboloid (for example, as shown in FIG. 10). The second reflective surface has a second preset shape and its specific shape parameters, such as the specific setting positions of the reflective plane and the reflection parabolic surface, the tilt angle of the reflective plane, and the curvature of the reflective paraboloid, may be obtained through reasonable adjusting, as long as that the white light emitted by the light source component can be incident on the light guide plate for total reflection propagation. For example, the second light adjusting component may use a reflective lampshade, and the present disclosure not limited thereto. The light emitted from the white light source is incident into the light guide plate 100 for total reflection. Since the diffraction angles of the light extracting structure 200 for lights with the different colors are different, the white light is extracted by the light extracting structure 200 at different diffraction angles to be monochromatic lights with the different colors. The first sub-electrodes of the first electrode in the driving electrodes 402 are distributed in an array, and are set in the sub-pixel regions in a one-to-one correspondence. There are multiple sub-pixel regions in each pixel region (as shown in FIG. 10, one pixel region includes three sub-pixel regions: R, G and B). The monochromatic lights with different colors have different diffraction angles, and will be incident on different sub-pixel regions in a one-to-one correspondence. However, in this case, the diffraction angles of the monochromatic lights with different colors are still larger than the critical angle of total reflection of the liquid crystal light adjusting layer 400. Therefore, when a first voltage (i.e., a reference voltage) is applied to the driving electrodes 402, the lights with the various colors are totally reflected in the liquid crystal light adjusting layer 400, and no light is emitted from a side of the liquid crystal light adjusting layer away from the first low refractive index layer, which realize display of dark state. When a second voltage is applied to the driving electrodes 402, as the arrangement periods of the grating-like electrode 4020 in the sub-pixel regions in each pixel region are different, different liquid crystal grating periods are formed corresponding to the sub-pixel regions into which the monochromatic lights with different colors are incident, and different sub-pixel regions have different diffraction efficiencies, as a result, the monochromatic lights with different colors are emitted at different exit angles to the human eyes, achieving directional color display.

In addition, in the embodiments, the display device further includes:

a liquid crystal light adjusting layer control unit, connected to the driving electrodes 402 and configured to control driving voltages on the driving electrodes 402 corresponding to the different sub-pixel regions in each pixel region.

With the above solution, different voltages are applied to the driving electrodes 402 in different sub-pixel regions of the same pixel region to control the liquid crystal deflection directions in the sub-pixel regions corresponding to the monochromatic lights with different colors, that is, the shapes of the liquid crystal gratings formed in different sub-pixel regions, which achieves the purpose of obtaining different diffraction efficiencies and then controlling the displayed gray levels.

Figure 11:
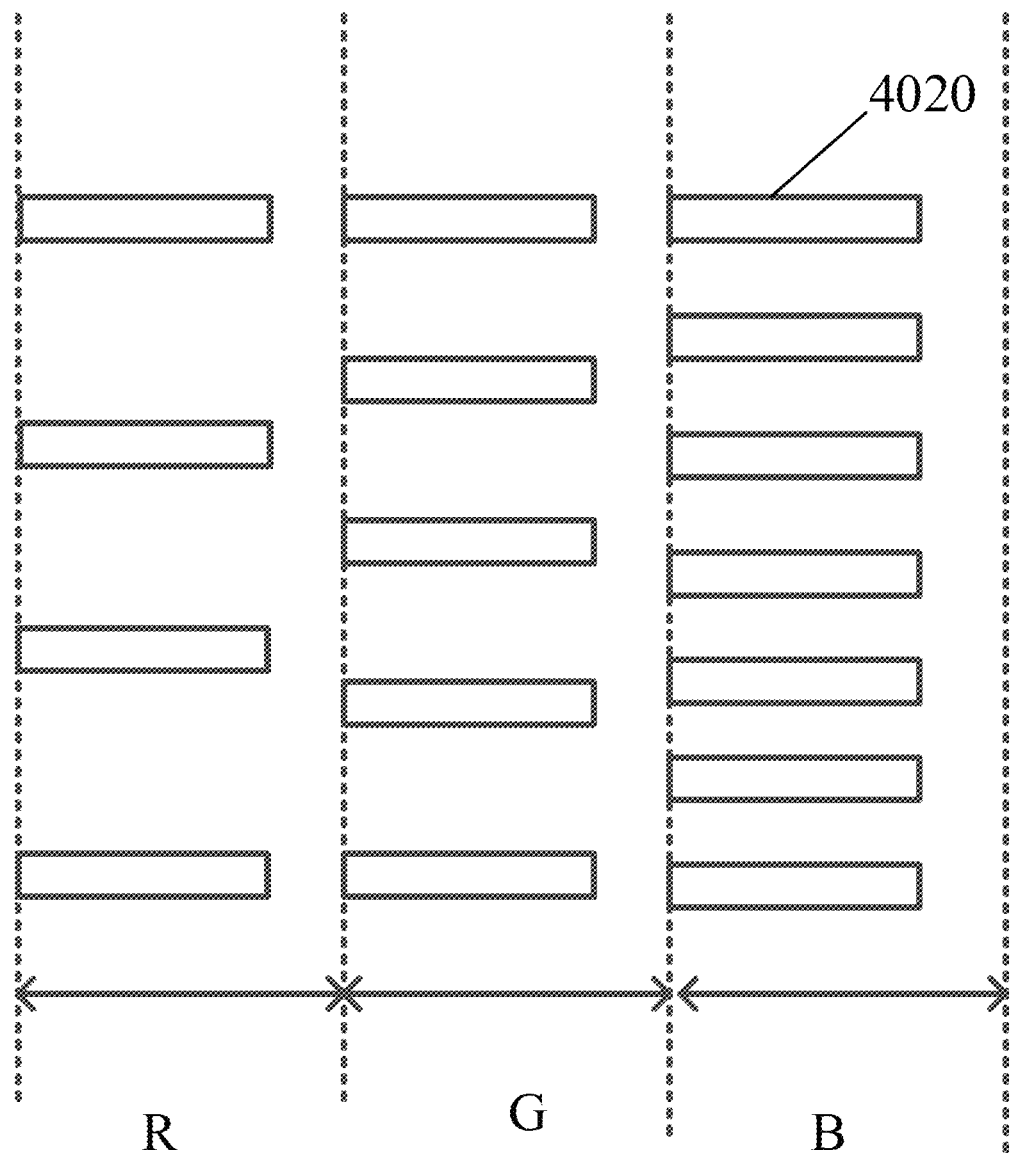
FIG. 11 is a schematic diagram of periodic arrangement of grating-like electrodes arranged in different sub-regions on the driving electrodes in FIG. 10.

In addition, in the embodiments, as shown in FIG. 10 and FIG. 11, the multiple monochromatic lights include red light, green light, and blue light, the multiple sub-pixel regions in each pixel region include a red light sub-pixel region R corresponding to the red light, a green light sub-pixel region G corresponding to the green light and a blue light sub-pixel region B corresponding to the blue light, an arrangement period of the multiple grating-like electrodes 4020 in the red light sub-pixel region R is greater than an arrangement period of the multiple grating-like electrodes 4020 in the green light sub-pixel region G, and the arrangement period of the multiple grating-like electrodes 4020 in the green light sub-pixel region G is greater than an arrangement period of the multiple grating-like electrodes 4020 in the blue light sub-pixel region B.

It should be noted that, the above solution is for the arrangement periods of the grating-like electrodes in the sub-pixel regions corresponding to the monochromatic lights in a case of color display.

In some embodiments, the above-mentioned liquid crystal light adjusting layer control unit and the light source control unit may be implemented by a separate controller or a controller in the display device.

In addition, another aspect of the embodiments of the present disclosure provides a method for controlling a display device. The method includes:

applying a first voltage to the driving electrodes to control the liquid crystal light adjusting layer to have the initial refractive index, so that light emitted from the first low refractive index layer is propagated in a totally reflected manner in the liquid crystal light adjusting layer, where the first voltage is a reference voltage;

applying a second voltage to the driving electrodes to adjust a deflection direction of the liquid crystal molecules in the liquid crystal light adjusting layer, so that light emitted from the first low refractive index layer is deflected by the liquid crystal light adjusting layer and emitted from a surface of the second low refractive index layer away from the liquid crystal light adjusting layer.

In the above solution, when a reference voltage (a first voltage) is applied to the driving electrodes, the liquid crystal light adjusting layer has the initial refractive index. In this case, the refractive index of the first low refractive index layer and the refractive index of the second low refractive index layer is smaller than the refractive index of the liquid crystal light adjusting layer. In this way, light emitted from the first low refractive index layer can be totally reflected in the liquid crystal light adjusting layer, in this case, no light is emitted from the liquid crystal light adjusting layer, and a dark state of display is achieved (the dark state as displayed refers to that there is no light emitted from the display surface of the display device); when a second voltage is applied to the driving electrodes in the liquid crystal light adjusting layer, the liquid crystal grating formed by the liquid crystal layer enables light emitted from the first low refractive index layer to the liquid crystal light adjusting layer to be diffracted and emitted, display of gray levels are achieved (the gray levels as displayed means that light is emitted from the display surface of the display device, and the gray levels are different when the amounts of lights emitted are different), and by controlling electrical signals applied to the driving electrodes of the liquid crystal molecules, different diffraction efficiencies of the liquid crystal gratings to the incident light can be achieved, thereby achieving display of arbitrary gray levels between L0 to L255.

It can be seen that in the display device and the control method provided by the present disclosure, display of the dark state can be realized by means of total reflection without the need for a polarizer, and display of gray levels can be achieved by change of voltages applied to the driving electrodes, which improves the influence of the polarizer on the light transmittance of the display device in the related technologies.

Further, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

driving the monochromatic light sources 701*a* corresponding to the monochromatic lights with different colors in the light source 700 in a time division manner, where driving voltages on the monochromatic light sources 701*a* corresponding to the monochromatic lights with different colors are the same, to enable the monochromatic lights with the colors to have a same brightness; and driving the driving electrodes in a time division manner, where different voltage are controlled to be applied to the driving electrodes corresponding to the different sub-pixel regions in each pixel region in different time periods, to adjust deflection directions of the liquid crystal molecules in the sub-pixel regions corresponding to the monochromatic lights with different colors, so as to control displayed gray levels of the monochromatic lights with different colors.

In the above solution, the light source 700 provides monochromatic lights with multiple colors, and the light source 700 is driven by the light source control unit in a time division manner. As shown in FIG. 8, a case where the light source 700 provides lights with three colors of red (R), green (G) and blue (B) is taken as an example, within 1 frame time, the driving time of each of the red light source, green light source and blue light source takes ⅓ of the time, and the red light source, the green light and the blue light source are controlled to have the same brightness; and the liquid crystal light adjusting layer control unit drives the driving electrodes 402 in a time division manner, and controls the displayed gray levels by controlling electrical signals applied to the driving electrodes 402 corresponding to different sub-pixel regions. Specifically, as shown in FIG. 8, the driving electrodes 402 may be provided with electrical signals via data lines (Data), within one frame time, the gate lines (Gate) are all turned on, and the data lines (Data) in one frame time apply different signals for time periods corresponding to different colors so as to control voltages applied to the driving electrodes 402 to be different, in this way, for the time periods in which lights with different colors are respectively emitted, the shape of the liquid crystal grating is different, and the liquid crystal grating has different diffraction efficiencies for lights with different colors. As a result, the displayed gray levels of different colors are controlled. FIG. 8 is a schematic diagram of white light display, in which case the ratio of the signal strengths of the data lines is approximately R:G:B=3:6:1.

Further, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

driving the driving electrodes 402 in a time division manner, where voltages applied to the driving electrodes 402 corresponding to the sub-pixel regions in different time periods are the same; and driving the monochromatic light sources 701a corresponding to the monochromatic lights with different colors in the light source 700 in a time division manner, where driving voltages on the monochromatic light sources 701a corresponding to the monochromatic lights with different colors are different, to adjust the deflection directions of the liquid crystal molecules in the sub-pixel regions corresponding to the lights with different colors, so as to control displayed gray levels of the monochromatic lights with f different colors.

In the above solution, the light source 700 provides monochromatic lights with multiple colors, and the light source 700 is driven by the light source control unit in a time division manner. As shown in FIG. 9, a case where the light source 700 provides lights with three colors of red (R), green (G), and blue (B) is taken as an example. In one frame time, the driving time of each of the red light source, the green light source, and the blue light source takes ⅓ of the time. By applying different voltages to the monochromatic light sources 701a with the various colors, the lights with different colors have different brightnesses. The liquid crystal light adjusting layer control unit drives the driving electrodes 402 in a time division manner, the electrical signals applied on the driving electrodes 402 corresponding to the sub-pixel regions in different time periods are the same (as shown in FIG. 9, Gate and Data are all turned on), and the driving electrodes 402 only serve as a switch (that is, no voltage is applied in the dark state, the liquid crystal is controlled not to be deflected, and voltage is applied in the gray level state to control the deflection of the liquid crystal). In this way, the displayed gray levels are controlled by controlling the brightnesses of the monochromatic light sources 701a with the various colors to be different.

Further, in the method, the applying the second voltage to the driving electrodes to adjust the deflection direction of the liquid crystal molecules in the liquid crystal light adjusting layer, so that light emitted from the first low refractive index layer is deflected by the liquid crystal light adjusting layer, and emitted from the surface of the second low refractive index layer away from the liquid crystal light adjusting layer, comprises:

controlling driving voltages on the driving electrodes corresponding to the different sub-pixel regions in each pixel region, to adjust deflection directions of the liquid crystal molecules in the different sub-pixel regions in each pixel region, so as to control displayed grey levels of different colors.

With the above solution, different voltages are applied to the driving electrodes 402 in different sub-pixel regions of the same pixel region to control the liquid crystal deflection directions in the sub-pixel regions corresponding to the monochromatic lights with different colors, that is, the shapes of the liquid crystal gratings formed in different sub-pixel regions, which achieves the purpose of obtaining different diffraction efficiencies and then controlling the displayed gray levels.

The above are merely optional implementation manners of the present disclosure. It should be noted that, for those skill in the art, various improvements and substitutions can be made without departing from the technical principles of the present disclosure. These improvements and substitutions shall fall within the protection scope of the present disclosure.

What is claimed is:

1. A display device, comprising:
    a light guide plate, wherein the light guide plate comprises a light incident side, a bottom surface and a light exiting surface, and the bottom surface and the light exiting surface are opposite to each other;
    a light extracting structure, arranged on a side of the light exiting surface or the bottom surface of the light guide plate and configured to enable light that is propagated in a totally reflected manner in the light guide plate to exit from the light exiting surface of the light guide plate at a predetermined angle;
    a first low refractive index layer, covering the light exiting surface of the light guide plate, wherein a refractive index of the light guide plate is greater than a refractive index of the first low refractive index layer;
    a liquid crystal light adjusting layer, comprising a liquid crystal layer and driving electrodes for driving liquid crystal molecules in the liquid crystal layer to be deflected, wherein the liquid crystal light adjusting layer is arranged on a side of the first low refractive index layer away from the light exiting surface; and
    a second low refractive index layer, arranged on a side of the liquid crystal light adjusting layer away from the first low refractive index layer, wherein each of the refractive index of the first low refractive index layer and a refractive index of the second low refractive index layer is smaller than an initial refractive index of the liquid crystal light adjusting layer.

2. The display device according to claim 1, wherein the initial refractive index of the liquid crystal light adjusting layer is a refractive index of the liquid crystal light adjusting layer when a reference voltage is applied to the driving electrode.

3. The display device according to claim 2, wherein the initial refractive index of the liquid crystal light adjusting layer is a refractive index of the liquid crystal light adjusting layer when the reference voltage applied to the driving electrodes is 0 volt.

4. The display device according to claim 1, wherein the display device comprises a plurality of pixel regions in an array, and each of the plurality of pixel regions comprises a plurality of sub-pixel regions;
    wherein the driving electrodes comprises: a first electrode comprising a plurality of first sub-electrodes arranged in one-to-one correspondence with the sub-pixel regions, and a second electrode arranged opposite to the first electrode; and wherein the second electrode is an entire block of electrode corresponding to the plurality of the first sub-electrodes, or, the second electrode comprises a plurality of second sub-electrodes each being arranged corresponding to at least one of the first sub-electrodes.

5. The display device according to claim 1, comprising a plurality of pixel regions in an array, wherein each of the plurality of pixel regions comprises a plurality of sub-pixel regions, the light extracting structure comprises a plurality of light extracting gratings in an array, and each of the plurality of light extracting gratings is arranged corresponding to one sub-pixel region.

6. The display device according to claim 1, wherein the liquid crystal light adjusting layer further comprises:
   a first alignment layer, arranged on a side of the liquid crystal layer close to the first low refractive index layer; and
   a second alignment layer, arranged on a side of the liquid crystal layer close to the second low refractive index layer.

7. The display device according to claim 1, wherein:
   the display device comprises a base substrate, arranged on a side of the liquid crystal layer away from the light guide plate, wherein the base substrate is made of a low refractive index material to form the second low refractive index layer; or
   the display device further comprises a base substrate separately arranged on a side of the second low refractive index layer away from the liquid crystal light adjusting layer.

8. The display device according to claim 1, further comprising:
   a light source, arranged on the light incident side of the light guide plate and configured to emit light into the light guide plate.

9. The display device according to claim 8, wherein the light source comprises:
   a first light source component, arranged on a side of the light incident side of the light guide plate, wherein the first light source component comprises a plurality of monochromatic light sources for emitting a plurality of monochromatic lights with different colors; and
   a first light adjusting component, arranged between the first light source component and the light incident side of the light guide plate;
   wherein, among the plurality of monochromatic light sources, the monochromatic light sources corresponding to the monochromatic lights with different colors are in different positions or have different light exiting angles, so that the monochromatic lights with different colors are incident into the light guide plate, via the first light adjusting component, at different preset angles to perform transmission in a totally reflected manner and are emitted from the light exiting surface of the light guide plate at a same exit angle by the light extracting structure.

10. The display device according to claim 9, wherein the first light adjusting component comprises a first reflective surface, the first reflective surface comprises a reflective plane and/or a reflective paraboloid, the first reflective surface is arranged facing a light exiting surface of the light source component, the first reflective surface has a first preset shape, and the first preset shape enables the monochromatic lights with different colors from light emitted by the first light source component to be incident into the light guide plate at the different preset angles to perform transmission in a totally reflected manner, and to be emitted from the light exiting surface of the light guide plate at the same exit angle by the light extracting structure.

11. The display device according to claim 8, further comprising:
   a light source control unit, connected to the light source and configured to drive monochrome light sources corresponding to monochromatic lights with different colors in the light source in a time division manner, wherein driving voltages on the monochrome light sources corresponding to the monochromatic lights with different colors are the same, so that the monochromatic lights with the colors have a same brightness; and
   a liquid crystal light adjusting layer control unit, connected to the driving electrodes, and configured to drive the driving electrodes in a time division manner and control to apply different voltages in different time periods to the driving electrodes corresponding to the different sub-pixel regions in each pixel region.

12. The display device according to claim 8, further comprising:
   a liquid crystal light adjusting layer control unit, connected to the driving electrodes and configured to drive the driving electrodes in a time division manner, wherein voltages applied to the driving electrodes corresponding to the sub-pixel regions in different time periods is the same; and
   a light source control unit, connected to the light source and configured to drive the monochrome light sources corresponding to the monochromatic lights with different colors in the light source in a time division manner, wherein driving voltages on the monochrome light sources corresponding to the monochromatic lights with different colors are different.

13. The display device according to claim 8, wherein the light source comprises:
   a second light source component, arranged on a side of the light incident side of the light guide plate and configured to emit white light; and
   a second light adjusting component, arranged between the second light source component and the light incident side of the light guide plate, and configured to enable the white light emitted by the second light source component to be incident into the light guide plate so as to be propagated in a totally reflected manner, and to be emitted from the light exiting surface of the light guide plate at different angles by the light extracting structure so as to be split into a plurality of monochromatic lights with different colors;
   wherein the display device comprises a plurality of pixel regions in an array, each of the plurality of pixel regions comprises a plurality of sub-pixel regions, the plurality of monochromatic lights respectively enters the plurality of sub-pixel regions in a one-to-one correspondence, the driving electrodes comprises a plurality of first sub-electrodes which is arranged in a one-to-one correspondence with the sub-pixel regions, each of the plurality of first sub-electrodes comprises a plurality of grating-like electrodes, and in the same pixel region, the grating-like electrodes in the first sub-electrodes corresponding to different sub-pixel regions have different arrangement periods.

14. The display device according to claim 13, wherein the second light adjusting component comprises a second reflective surface, the second reflective surface comprises a reflective plane and/or a reflective paraboloid, the second reflective surface is arranged facing a light exiting surface of the second light source component, the second reflective surface has a second preset shape, and the second preset shape enables the white light emitted by the second light source component to enter the light guide plate so as to be propagated in a totally reflected manner.

15. The display device according to claim 13, further comprising:
    a liquid crystal light adjusting layer control unit, connected to the driving electrodes and configured to control driving voltages on the driving electrodes corresponding to the different sub-pixel regions in each pixel region.

16. The display device according to claim 13, wherein the plurality of monochromatic lights comprise red light, green light, and blue light, the plurality of sub-pixel regions in each pixel region comprises a red light sub-pixel region corresponding to the red light, a green light sub-pixel region corresponding to the green light and a blue light sub-pixel region corresponding to the blue light, an arrangement period of the plurality of grating-like electrodes in the red light sub-pixel region is greater than an arrangement period of the plurality of grating-like electrodes in the green light sub-pixel region, and the arrangement period of the plurality of grating-like electrodes in the green light sub-pixel region is greater than an arrangement period of the plurality of grating-like electrodes in the blue light sub-pixel region.

17. The display device according to claim 1, wherein the display device is a transparent display device without a polarizer and a light shielding layer.

18. The display device according to claim 1, wherein the light extracting structure comprises a reflection grating arranged on the bottom surface of the light guide plate.

* * * * *